United States Patent
Wang et al.

(10) Patent No.: US 11,184,773 B2
(45) Date of Patent: Nov. 23, 2021

(54) SECURITY AUDITING SYSTEM AND METHOD

(71) Applicants: BEIJING SMARTCHIP MICROELECTRONICS TECHNOLOGY COMPANY LIMITED, Beijing (CN); STATE GRID INFORMATION & TELECOMMUNICATION GROUP CO., LTD., Beijing (CN); State GRID CORPORATION OF CHINA, Beijing (CN)

(72) Inventors: Yubo Wang, Beijing (CN); Xiaoke Tang, Beijing (CN); Zhongqiang Dun, Beijing (CN); Yi Hu, Beijing (CN); Jie Gan, Beijing (CN); Bingrong Cui, Beijing (CN); Song Cheng, Beijing (CN); Tianyu Yan, Beijing (CN)

(73) Assignees: BEIJING SMARTCHiP MICROELECTRONICS TECHNOLOGY COMP, Beijing (CN); STATE GRID INFORMATION & TELECOMMUNICATION GROUP, Beijing (CN); STATE GRID CORPORATION OF CHINA, Beijing (CN)

( * ) Notice: Subject to any disclaimer, the term of this patent is extended or adjusted under 35 U.S.C. 154(b) by 0 days.

(21) Appl. No.: 16/969,736

(22) PCT Filed: Jul. 30, 2019

(86) PCT No.: PCT/CN2019/098469
§ 371 (c)(1),
(2) Date: Aug. 13, 2020

(87) PCT Pub. No.: WO2020/042856
PCT Pub. Date: Mar. 5, 2020

(65) Prior Publication Data
US 2020/0404487 A1 Dec. 24, 2020

(30) Foreign Application Priority Data
Aug. 27, 2018 (CN) .......................... 201810980737.2

(51) Int. Cl.
*H04W 12/00* (2021.01)
*H04W 12/06* (2021.01)
(Continued)

(52) U.S. Cl.
CPC ........... *H04W 12/35* (2021.01); *H04W 8/183* (2013.01); *H04W 8/205* (2013.01); *H04W 12/06* (2013.01); *H04W 12/40* (2021.01)

(58) Field of Classification Search
CPC ..... H04W 12/06; H04W 12/08; H04W 12/35; H04W 12/37; H04W 12/40; H04W 8/183; H04W 8/205
See application file for complete search history.

(56) References Cited

U.S. PATENT DOCUMENTS 6,532,543 B1 * 3/2003 Smith ........................ G06F 8/65
370/517
6,918,038 B1 * 7/2005 Smith ........................ G06F 8/65
709/223
(Continued)

FOREIGN PATENT DOCUMENTS

CN 1859114 A 11/2006
CN 102711089 A 10/2012
(Continued)

OTHER PUBLICATIONS

Di M, CN108024243 Google Translation, May 11, 2018 (year: 2018).*
International Search Report in the international application No. PCT/CN2019/098469, dated Sep. 26, 2019, 2 pgs.

*Primary Examiner* — Liton Miah

(74) *Attorney, Agent, or Firm* — Cooper Legal Group, LLC

(57) ABSTRACT

Disclosed in the embodiments of the present invention are a security auditing system and a method for same. The security auditing system comprises an eSIM module. The eSIM module is configured to: on the basis of pre-stored auditing rules, perform a security check on each received network connection request; if the security check is passed, determine said network connection request to be a legitimate request and allow the main control terminal that sent the network connection request to perform mobile network connection; and if the security check is not passed, determine the network connection request to be an illegitimate request and prohibit the main control terminal that sent the network connection request from performing mobile network connection.

13 Claims, 3 Drawing Sheets

(51) Int. Cl.
*H04W 8/20* (2009.01)
*H04W 8/18* (2009.01)
*H04W 12/30* (2021.01)
*H04W 12/40* (2021.01)

(56) References Cited

U.S. PATENT DOCUMENTS

| | | | |
|---|---|---|---|
| 9,264,429 B2* | 2/2016 | Harris | H04L 63/10 |
| 9,949,113 B1 | 4/2018 | Vasudevan et al. | |
| 10,149,150 B1 | 12/2018 | Vasudevan et al. | |
| 2012/0324222 A1* | 12/2012 | Massey | H04W 12/08 |
| | | | 713/166 |
| 2018/0352425 A1 | 12/2018 | Vasudevan et al. | |

FOREIGN PATENT DOCUMENTS

| | | |
|---|---|---|
| CN | 104581721 A | 4/2015 |
| CN | 105141621 A | 12/2015 |
| CN | 105320873 A | 2/2016 |
| CN | 106131090 A | 11/2016 |
| CN | 107613487 A | 1/2018 |
| CN | 108024243 A | 5/2018 |
| CN | 108040044 A | 5/2018 |
| CN | 109246704 A | 1/2019 |
| EP | 2299631 A1 | 3/2011 |
| EP | 2741548 B1 | 11/2016 |

\* cited by examiner

SECURITY AUDITING SYSTEM AND METHOD

CROSS-REFERENCE TO RELATED APPLICATION

This application is based on and claims priority for Chinese patent application No. 201810980737.2 filed on Aug. 27, 2018, the entirety of which is incorporated herein for reference.

TECHNICAL FIELD

The disclosure relates to the field of wireless communication, and more particularly to a security auditing system and method for remote connection.

BACKGROUND

With the continuous development of wireless networks, wireless communication technology has been widely applied in various industries. The technology uses the existing wireless network resources of the operator, and has advantages of large coverage, low use cost, and good communication quality. In the power system, wireless communication technology has become the main transmission method.

In the existing power collection system, a master control terminal cannot directly connect with a business master station. When the master control terminal needs to connect, such as wireless connect, with the business master station, the master control terminal mainly depends on a remote communication module to connect with the business master station. Further, the master control terminal sends a network connection instruction to the remote communication module, and the remote communication module unconditionally connects to the business master station. However, this unconditional connection cannot guarantee data security.

The information disclosed in the background part is only intended to increase overall understanding of the background of the embodiments of the disclosure, and is not be taken as an acknowledgement or suggesting in any way that the information constitutes prior art well known to those skilled in the art.

SUMMARY

The embodiments of the disclosure provide a security auditing system and method, which can at least increase security of communication data.

To achieve the above purpose, a security auditing system is provided according to the embodiments of the disclosure, which includes an embedded universal integrated circuit card (eSIM) module.

The embedded universal integrated circuit card (eSIM) module is configured to: perform security auditing on a received network connection request according to pre-stored auditing rules; determine that the network connection request is a legal request and allow a master control terminal which initiates the network connection request to perform a mobile network connection, in response to that the security auditing is successful; determine that the network connection request is an illegal request and prohibit the master control terminal which initiates the network connection request from performing the mobile network connection, in response to that the security auditing is failed.

In an exemplary embodiment, the eSIM module is configured to record information on the illegal request.

In an exemplary embodiment, the system further includes a security server.

The security server is coupled with the eSIM module, and is configured to store the information on the illegal request recorded by the eSIM module.

In an exemplary embodiment, the security server is further configured to: configure the auditing rules and uploading rules, and write the auditing rules and the uploading rules into the eSIM module for storing in the eSIM module.

Correspondingly, the eSIM module is configured to perform security auditing on the network connection request according to the auditing rules; and upload the recorded information on the illegal request to the security server according to the uploading rules.

In an exemplary embodiment, the system further includes the master control terminal, a remote communication module and a business master station.

The master control terminal is inserted with the remote communication module, and the eSIM module is welded on the remote communication module.

The remote communication module is configured to receive the network connection request initiated by the master control terminal and send the network connection request to the eSIM module.

The business master station establishes communication with the master control terminal through the remote communication module in response to that the network connection request passes the security auditing of the eSIM module and the master control terminal successfully connects with the mobile network.

A security auditing method is further provided according to the embodiments of the disclosure, which includes operations as follows.

Security auditing is performed on a received network connection request according to pre-stored auditing rules.

In response to that the security auditing is successful, it is determined that the network connection request is a legal request, and a master control terminal which initiates the network connection request is allowed to perform a mobile network connection.

In response to that the security auditing is failed, it is determined that the network connection request is an illegal request, and the master control terminal which initiates the network connection request is prohibited from performing the mobile network connection.

In an exemplary embodiment, the method further includes an operation that information on the illegal request is recorded.

In an exemplary embodiment, the method further includes an operation that the recorded information on the illegal request is uploaded.

In an exemplary embodiment, the method further includes operations as follows.

The configured auditing rules and configured uploading rules are received.

Security auditing is performed on the network connection request according to the auditing rules.

The recorded information on the illegal request is uploaded according to the uploading rules.

In an exemplary embodiment, the method further includes operations as follows.

The network connection request which is initiated by the master control terminal and forwarded by a remote communication module are received. The remote communication module is inserted into the master control terminal.

In response to that the network connection request passes the security auditing and the master control terminal is successfully connected to the mobile network, the master control terminal communicates with a business master station through the remote communication module.

As compared with the prior art, an embedded universal integrated circuit card (eSIM) module with an security level of machine to machine (M2M) is used in the embodiments of the disclosure, and based on the eSIM module, security auditing is performed on a connection event initiated by the master control terminal. If the security auditing is successful, it is determined that the network connection request is a legal request, and the master control terminal which initiates the network connection request is allowed to perform a mobile network connection. If the security auditing is failed, it is determined that the network connection request is an illegal request, and the master control terminal which initiates the network connection request is prohibited from performing a mobile network connection. Without changing the existing master station model and collecting system architecture and increasing hardware cost of the master control terminal, the security auditing is performed on the connection event initiated by the master control terminal based on the eSIM module, thereby ensuring data security. The improvement of security can further expand applications of the eSIM module and the remote communication module, and ensure security of connection with other business master stations, and meet the needs of business expansion.

DETAILED DESCRIPTION

The implementation of the embodiments of the disclosure is illustrated in detail below in conjunction of the accompanying drawings. But it should be understood that the scope of protection of the embodiments of the disclosure is not limited to the implementation.

Unless otherwise expressly stated, in the whole specification and claims, the terms "include" or variants like "comprise" or "including" thereof are understood to include the stated elements or components which are not excluded.

In the related art, for the existing power collection system, the solution that a master control terminal connects with a business master station by unconditional connection of a remote communication module with the business master station is described as follows.

Figure 1:
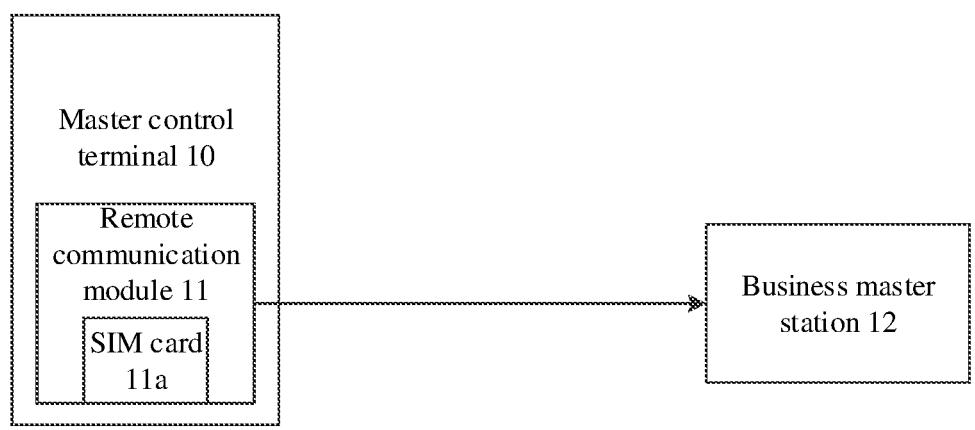
FIG. 1 shows an structure of an existing remote connection between a master control terminal and a business master station.

The remote communication module has a function of grouping wireless data packets. FIG. 1 is a schematic diagram of an existing remote connection of a master control terminal. In the schematic diagram, four components, that is, a master control terminal 10, a remote communication module 11, a subscriber identification module (SIM) card 11a, and a business master station 12 are included. A network connection process is described as follows. The master control terminal 10 sends a network connection request instruction to the remote communication module 11, the remote communication module 11 performs a mobile network connection through the SIM card 11a, and the remote communication module 11 connects with the business master station 12 to open a data path.

In the above solution, the remote communication module only plays the role of a data path, and the SIM card in the remote communication module is mainly used for network authentication. If an IP address configured by the master control terminal is maliciously tampered, there is a risk of data being leaked.

In view of the problem of a leakage risk since no security auditing is performed in a remote connection process of the existing master control terminal, a security auditing system and method are provided according to the embodiments of the disclosure. The principle of the security auditing system and method is to upgrade the pluggable SIM card to an eSIM module with a security level of machine to machine (M2M). Based on the remote communication module and the eSIM module, security auditing is performed on each connection event (a network connection request). Further, upon receiving a network connection instruction sent by the master control terminal, the remote communication module transmits the connection event to the eSIM module. The eSIM module analyzes the connection event, mainly analyzes whether the connection event is a legal connection event or an illegal (malicious) connection event. If the connection event is a legal connection event, the security auditing is successful and it is determined that the network connection request is a legal request, and the master control terminal which initiates the network connection request is allowed to perform a mobile network connection. If the connection event is an illegal connection event, the security auditing is failed and it is determined that the network connection request is an illegal request, and the master control terminal which initiates the network connection request is prohibited from performing a mobile network connection. If the connection event is determined as a malicious connection event, the eSIM module reports the malicious connection event to the security server. The reporting of the eSIM module may be real-time reporting or periodic reporting. Alternatively, the reporting may be voluntary reporting, or reporting based on a certain trigger event, such as in response to a report request from a security server, which is not limited.

It can be understood that in the embodiments of the disclosure, since the master control terminal performs security auditing through the eSIM module and connects with a remote security server, a security auditing system and method for remote connection are provided.

Figure 2:
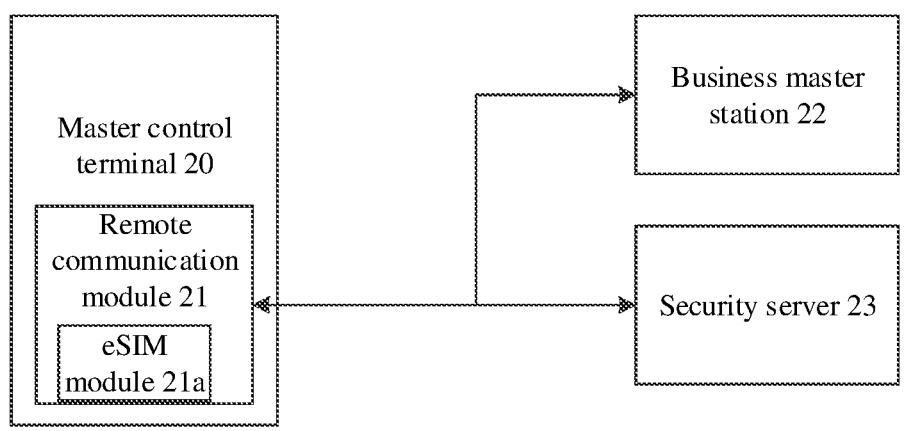
FIG. 2 is a schematic structural diagram of a security auditing system according to an exemplary embodiment of the disclosure.
Figure 3:
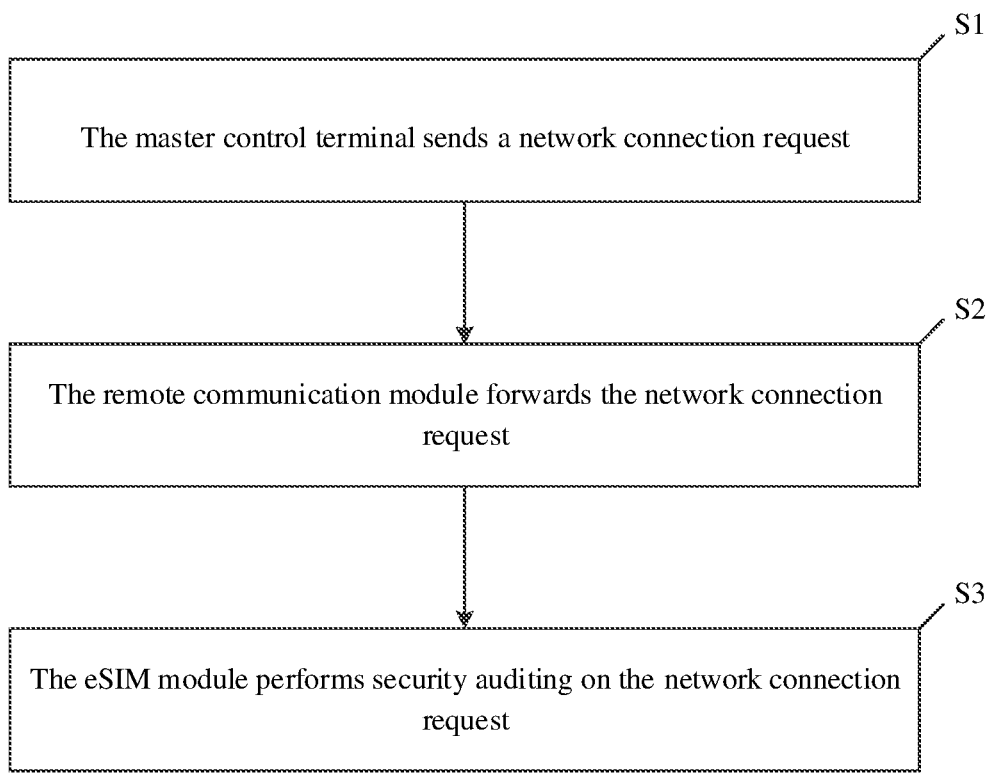
FIG. 3 is a flowchart of a security auditing method according to an exemplary embodiment of the disclosure.

FIG. 2 is a schematic structural diagram of a security auditing system according to an exemplary embodiment of the disclosure. The security auditing system includes a master control terminal 20, a remote communication module 21, an eSIM module 21a, a business master station 22 and a security server 23.

It should be noted that the master control terminal 20 in the embodiment of the disclosure is a communication entity which cannot connect with other devices such as the business master station and/or the security server, and needs to be connected through a remote communication module 21 inserted into the master control terminal 20. The remote communication module 21 is welded with an eSIM module 21a, and the eSIM module 21a is welded on a bottom plate of the remote communication module 21. The remote communication module 21 is configured to receive a network connection request initiated by the master control terminal 20 and send the network connection request to the eSIM module 21a.

The eSIM module 21a is used to store auditing rules, and is configured to perform security auditing on each received network connection request according to the auditing rules. If the security auditing is successful, the network connection request is determined to be a legal request, and the master control terminal 20 which initiates the network connection request is allowed to perform a mobile network connection. Otherwise, the network connection request is determined as an illegal request, and the master control terminal 20 which initiates the network connection request is prohibited from performing a mobile network connection, or not allowed to perform a mobile network connection.

The network connection request which is initiated by the master control terminal and is sent to the eSIM module 21a from the remote communication module 21 carries information of the business master station that the master control terminal wants to access, such as an identifier and/or an Internet Protocol (IP) address of the business master station 22. The eSIM module 21a performs security auditing on the network connection request initiated by the master control terminal 20, which is equivalent to an operation that determining whether the business master station 22 that the master control terminal wants to access appears on a white list of business master stations based on the identifier and/or the IP address of the business master station 22. If the business master station 22 appears in the white list, it is determined that the network connection request passes the security auditing. If the business master station 22 does not appear in the white list, it is determined that the network connection request does not pass the security auditing. The white list of business master stations is preset, and records business master stations which can be accessed by the master control terminal, and identifiers and/or IP address information thereof.

In practical applications, a legal terminal can access the business master station that appears on the white list of business master stations. In order to avoid access of an illegal terminal to the business master station, it can be understood that the eSIM module 21a performs security auditing on the network connection request initiated by the master control terminal, that is, performing auditing on legality of the master control terminal which needs to access the business master station and is inserted with the remote communication module 21 welded with the eSIM module 21a, to avoid malicious access to the business master station by illegal terminals.

The eSIM module 21a is further configured to record information of the illegal request. In addition, the eSIM module 21a is further configured to record network signal quality information during security auditing. The eSIM module 21a is further configured to store uploading rules. The eSIM module 21a is configured to upload the recorded information on the illegal request, the network signal quality and other information to the security server 23 according to the uploading rules. The operation that the eSIM module 21a uploads the recorded content described above to the security server 23 according to the uploading rules may be understood as operations as follows. When a level of the recorded illegal request is higher than a preset level threshold, that is, a level of the illegal request is high, the recorded illegal request with the high level is uploaded to the security server 23. The eSIM module 21a uploads the recorded content to the security server 23 in response to an uploading request of the security server 23. In a case that space capacity for recording of the eSIM module 21a is lower than a preset capacity threshold, that is, when more contents are recorded in the eSIM module 21a, the recorded content is actively uploaded to the security server 23. Different contents recorded in the eSIM module 21a may be uploaded simultaneously or may be uploaded in a certain order, such as a recording order, which is not limited.

It can be understood that, for the information on the illegal connection request uploaded by the eSIM module 21a, the security server 23 analyzes the information on the illegal connection request, such as performing statistics on the number of illegal connection requests and/or the identification of the master control terminal that initiates the illegal connection request, to avoid multiple accesses of the same illegal terminal. For the network signal quality information uploaded by the eSIM module 21a, the security server 23 evaluates a current network environment to obtain an evaluation result. The uploading rules may be flexibly adjusted according to the evaluation result. For example, when the evaluation result indicates that a network environment where the master control terminal 20 is currently located is good, more records are allowed to be uploaded to the security server 23. When the evaluation result indicates that a network environment where the master control terminal 20 is currently located is poor, fewer records are allowed to be uploaded to the security server 23, to avoid upload failure caused by uploading too many records when the network environment is poor.

In a case where the network connection request passes the security auditing of the eSIM module 21a and the master control terminal successfully connects to the mobile network, the master control terminal 20 establishes communication with the business master station 22 through the remote communication module 21.

The data stored in the eSIM module 21a cannot be read and written externally, and can only be updated by itself and the trusted security server 23, to ensure security of the data of the eSIM module 21a.

Before the trusted security server 23 may perform an operation such as modification, maintenance and deletion on the eSIM module 21a, the following verification process needs to be performed. After the master control terminal 20 accesses the network through the eSIM module 21a and communicates with the security server 23 through the remote communication module 21. Further, the master control terminal 20 sends identity information thereof and uplink security authentication information to the security server 23 through the remote communication module 21. The security server 23 performs identity authentication and uplink security verification on the master control terminal 20 according to the identity information and the received uplink security authentication information. In response to that both the identity authentication and the uplink security verification are successful, the security server 23 sends downlink security authentication information to the master control terminal 20, which is specifically the remote communication module 21. The remote communication module 21, which is specifically the eSIM module 21a, performs authentication on the downlink security authentication information. After the authentication is successful, the security server 23 is allowed to perform update operation such as modification, deletion and writing on the eSIM module. It can be understood that the above verification process refers to that both the eSIM module 21a and the security server 23 perform verification with each other. The verification process is two-way verification. After the two-way verification, the update operation such as modification, maintenance and deletion are allowed to be performed.

The security server 23 is configured to store the information uploaded by the eSIM module 21a, and is further configured to configure auditing rules and uploading rules, and write the auditing rules and uploading rules into the eSIM module 21a to be stored and used by the eSIM module 21a. The security server 23 may reasonably configure the uploading rules according to different distribution conditions of master control terminals in various places, the number of reads and writes of the eSIM module 21a and/or processing capability of the security server. That is, the uploading rules in the embodiments of the disclosure can be flexibly configured based on the actual situation. For example, when a network environment connected between the security server 23 and the master control terminal 20 is poor, the master control terminal 20 is allowed to upload less recorded content to the security server 23 through the remote communication module 21, which can be regarded as a solution for flexibly configuring the uploading rules based on the actual network environment. Considering that space capacity for recording of the eSIM module 21a is limited, the uploading rule may be set as, when recordable space capacity is lower than a preset capacity threshold, that is, when the space capacity for recording is less, triggering the eSIM module 21a to upload the recorded information, thereby implementing intelligent uploading of the eSIM module 21a.

Those skilled in the art can understand that the eSIM module 21a may upload geographic location data, security attack data and a network condition such as network signal quality information of the master control terminal 20 in addition to the above information. It can be seen that the eSIM module 21a can upload multiple types of service data, thereby implementing expansion for the function of the eSIM module 21a, functional diversity of the eSIM module 21a. The security attack data may be understood as existence of illegal security servers which want to access it.

Compared with the prior art, the eSIM module and the security server are added to the above security auditing system and method, and the auditing mechanism (auditing rules) and uploading mechanism (uploading rules) are combined to make the communication environment between the master control terminal and the business master station safer. Under the security guarantee of the system, the business master station can be further increased to flexibly expand the business.

Based on the security auditing system of the above embodiment, FIG. 2 shows a security auditing method according to an embodiment. The security auditing method includes operations S1 to S3.

The operation that a master control terminal sends a network connection request at S1 includes an operation that the master control terminal 20 sends a network connection request to the remote communication module 21.

The operation that the remote communication module forwards the network connection request at S2 includes an operation that the remote communication module 21 sends the network connection request to the eSIM module 21a.

The operation that security auditing is performed on the network connection request at S3 includes an operation that the eSIM module 21a performs security auditing on the network connection request according to auditing rules. In response to that the security auditing is successful, it is determined that the network connection request is a legal request and a prompt is fed back to the remote communication module 21. The remote communication module 21 normally performs a network connection and establishes communication with the business master station 22. In response to that the security auditing is failed, it is determined that the network connection request is an illegal request, and a prompt is fed back to the remote communication module 21. The remote communication module 21 does not perform a mobile network connection, that is, the remote communication module does not perform a network connection. According to the uploading rules, the eSIM module 21a uploads information on the illegal request to the security server 23 in response to an uploading request of the security server 23, a high level of the recorded illegal request or small remaining space for recording.

For an implementation process of the data communication between the master control terminal 20 and the business master station 22, reference may be made to the related description, and is not be repeated here.

In the security auditing system and method according to the embodiments of the disclosure, the eSIM module with a security level of M2M is used. On the one hand, the security of data can be ensured, and on the other hand, multiple types of business data can be uploaded by expanding the function of the eSIM module. The eSIM module performs security auditing on a network connection event initiated by the master control terminal. If the security auditing is successful, it is determined that the network connection request is a legal request, and the master control terminal which initiates the network connection request is allowed to perform a mobile network connection. If the security auditing is failed, it is determined that the network connection request is an illegal request, and the master control terminal which initiates the network connection request is prohibited from performing a mobile network connection. Without changing the existing master station model and collecting system architecture and increasing hardware cost of the master control terminal, the security auditing is performed on the connection event initiated by the master control terminal based on the eSIM module, thereby ensuring data security. The improvement of security can further expand applications of the eSIM module and the remote communication module, and ensure the security of connection with other business master stations, and meet the needs of business expansion. If the connection event is determined as a malicious connection event, the eSIM module reports the malicious connection event to the security server.

The embodiments of the disclosure further provide a computer-readable storage medium having stored thereon computer program, which, when being executed by a processor, implements the operations of the security auditing method of the above embodiment. The computer-readable storage medium may be a memory.

The embodiments of the disclosure further provide a security auditing system, which includes a processor and a memory for storing a computer program that can be run on the processor. The processor executes the operations of the above security auditing method when executing the above computer program.

Those skilled in the art should understand that the embodiments of the disclosure may be embodied as methods, systems or computer program products. Therefore, the disclosure may take the form of complete hardware embodiments, complete software embodiments or embodiments combining software and hardware. Furthermore, the disclosure may take the form of a computer program product implemented on one or more computer-usable storage media (including but not limited to a disk memory, a compact disc read-only memory (CD-ROM), an optical memory and the like) including computer-usable program codes.

The disclosure is described with reference to flow charts and/or block diagrams of methods, devices (systems) and computer program products according to the embodiments of the disclosure. It should be understood that each flow and/or block in flow charts and/or block diagrams and a combination of flows and/or blocks in flow charts and/or block diagrams may be implemented by computer program instructions. These computer program instructions may be provided to a processor of a general-purpose computer, a special-purpose computer, an embedded processor or other programmable data processing devices to produce a machine, such that the instructions executed by the processor of a computer or other programmable data processing devices generate a device configured to implement the functions specified in one or multiple flows in flow charts and/or one or multiple blocks in block diagrams.

These computer program instructions may also be stored in a computer-readable memory that can guide a computer or other programmable data processing devices to operate in a specific mode, such that the instructions stored in the computer-readable memory generate a manufactured product including an instruction device, and the instruction device implements the functions specified in one or multiple flows in flow charts and/or one or multiple blocks in block diagrams.

These computer program instructions may also be loaded onto a computer or other programmable data processing devices, such that a series of operation steps are performed on the computer or other programmable devices to generate computer-implemented processing, and the instructions executed by the computer or other programmable devices provide steps for implementing the functions specified in one or multiple flows in flow charts and/or one or multiple blocks in block diagrams.

Finally, it should be noted that the above embodiments are only used to illustrate the technical solutions of the disclosure, and are not intended to limit the scope of protection thereof. Although the disclosure is described in detail with reference to the above embodiments, it should be understand that after reading this disclosure, those skilled in the art may still make various changes, modifications or equivalent substitutions to the specific embodiments of the disclosure. However, these changes, modifications or equivalent substitutions shall be within the scope of protection of the claims to be approved.

INDUSTRIAL APPLICATION

In the embodiment of the disclosure, the eSIM module with a security level of M2M is used. For the master control terminal, the eSIM module performs security auditing on a network connection event initiated by the master control terminal. In response to that it is determined that the network connection event is a non-malicious connection event, such as a normal connection request, the master control terminal is allowed to perform a network connection. In response to that it is determined that the network connection event is a malicious connection event, the master control terminal is prohibited from performing a network connection, that is, being not allowed to perform a network connection. The eSIM module reports the malicious connection event to the security server. In the embodiments of the disclosure, without increasing hardware cost of the master control terminal, the security auditing on the connection event initiated by the master control terminal based on the eSIM module ensures data security.

The invention claimed is:

1. A security auditing system, comprising:
an embedded universal integrated circuit card (eSIM) module, configured to:
perform security auditing on a received network connection request according to stored auditing rules;
in response to the security auditing being successful, determine that the network connection request is a legal request, and allow a master control terminal which initiates the network connection request to perform a mobile network connection; and
in response to the security auditing failing, determine that the network connection request is an illegal request, and prohibit the master control terminal which initiates the network connection request from performing the mobile network connection;
wherein the security auditing system further comprises:
the master control terminal inserted with a remote communication module, wherein the eSIM module is welded on the remote communication module;
the remote communication module, configured to receive the network connection request initiated by the master control terminal and send the network connection request to the eSIM module; and
a business master station, configured to establish communication with the master control terminal through the remote communication module in response to the network connection request passing the security auditing of the eSIM module and the master control terminal successfully connecting with a mobile network;
wherein performing the security auditing on the received network connection request according to the stored auditing rules comprises:
determining, based on at least one of an identifier or an Internet Protocol (IP) address of the business master station, whether the business master station that the master control terminal wants to access appears on a white list of business master stations;
determining that the network connection request passes the security auditing when the business master station appears in the white list; and
determining that the network connection request does not pass the security auditing when the business master station does not appear in the white list.

2. The security auditing system of claim 1, wherein the eSIM module is configured to record information on the illegal request.

3. The security auditing system of claim 2, further comprising:
a security server, configured to store the information on the illegal request recorded by the eSIM module.

4. The security auditing system of claim 3, wherein the security server is further configured to:
configure the auditing rules and uploading rules, and write the auditing rules and the uploading rules into the eSIM module for storing in the eSIM module; and
the eSIM module is configured to perform the security auditing on the network connection request according to the stored auditing rules, and upload the recorded information on the illegal request to the security server according to the uploading rules.

5. A security auditing method, executed by an embedded universal integrated circuit card (eSIM) module, comprising:
receiving a network connection request which is initiated by a master control terminal and forwarded by a remote communication module, wherein the master control terminal is inserted with the remote communication module, and the eSIM module is welded on the remote communication module;

performing security auditing on the network connection request according to pre-stored auditing rules;

in response to the security auditing being successful, determining that the network connection request is a legal request, and allowing the master control terminal which initiates the network connection request to perform a mobile network connection; and in response to the security auditing failing, determining that the network connection request is an illegal request, and prohibiting the master control terminal which initiates the network connection request from performing the mobile network connection;

wherein in response to the network connection request passing the security auditing and the master control terminal successfully connecting to a mobile network, the master control terminal communicates with a business master station through the remote communication module;

wherein performing the security auditing on the network connection request according to the pre-stored auditing rules comprises:

determining, based on at least one of an identifier or an Internet Protocol (IP) address of the business master station, whether the business master station that the master control terminal wants to access appears on a white list of business master stations;

determining that the network connection request passes the security auditing when the business master station appears in the white list; and determining that the network connection request does not pass the security auditing when the business master station does not appear in the white list.

6. The security auditing method of claim 5, further comprising:

recording information on the illegal request.

7. The security auditing method of claim 6, further comprising:

uploading the recorded information on the illegal request.

8. The security auditing method of claim 7, further comprising:

receiving the configured auditing rules and configured uploading rules;

performing the security auditing on the network connection request according to the pre-stored auditing rules; and uploading the recorded information on the illegal request according to the configured uploading rules.

9. A security auditing system, comprising a processor, and a memory for storing a computer program run on the processor, wherein the processor is configured to run the computer program to implement operations of:

receiving a network connection request which is initiated by a master control terminal and forwarded by a remote communication module, wherein the master control terminal is inserted with the remote communication module, and an embedded universal integrated circuit card (eSIM) module is welded on the remote communication module;

performing security auditing on the network connection request according to pre-stored auditing rules;

in response to the security auditing being successful, determining that the network connection request is a legal request, and allowing the master control terminal which initiates the network connection request to perform a mobile network connection; and in response to the security auditing is failing, determining that the network connection request is an illegal request, and prohibiting the master control terminal which initiates the network connection request from performing the mobile network connection;

wherein in response to the network connection request passing the security auditing and the master control terminal successfully connecting to a mobile network, the master control terminal communicates with a business master station through the remote communication module;

wherein performing the security auditing on the network connection request according to the pre-stored auditing rules comprises:

determining, based on at least one of an identifier or an Internet Protocol (IP) address of the business master station, whether the business master station that the master control terminal wants to access appears on a white list of business master stations;

determining that the network connection request passes the security auditing when the business master station appears in the white list; and determining that the network connection request does not pass the security auditing when the business master station does not appear in the white list.

10. The security auditing system of claim 9, wherein the processor is configured to run the computer program to implement an operation of:

recording information on the illegal request.

11. The security auditing system of claim 10, wherein the processor is configured to run the computer program to implement an operation of:

uploading the recorded information on the illegal request.

12. The security auditing system of claim 11, wherein the processor is configured to run the computer program to implement operations of:

receiving the configured auditing rules and configured uploading rules;

performing the security auditing on the network connection request according to the pre-stored auditing rules; and uploading the recorded information on the illegal request according to the configured uploading rules.

13. A non-transitory computer-readable memory medium having stored thereon a computer program, which, when being executed by a processor, implements operations of the security auditing method of claim 5.

* * * * *